United States Patent
Nomura et al.

(10) Patent No.: US 6,301,206 B1
(45) Date of Patent: Oct. 9, 2001

(54) OPTICAL DISC DRIVE APPARATUS AND OPTICAL DISC DRIVE CONTROL METHOD

(75) Inventors: Akihisa Nomura; Hiroyuki Tanaka; Toshiaki Shimone, all of Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/187,750

(22) Filed: Nov. 9, 1998

(30) Foreign Application Priority Data

Oct. 11, 1997 (JP) .................................................... 9-307211

(51) Int. Cl.⁷ ........................................................ G11B 7/00
(52) U.S. Cl. .................................. 369/44.34; 369/124.05
(58) Field of Search ............................... 369/44.26, 44.27, 369/44.29, 44.34, 44.35, 47.35, 47.15, 124.05

(56) References Cited

U.S. PATENT DOCUMENTS

| | | | |
|---|---|---|---|
| 5,191,566 | * | 3/1993 | Yamaguchi et al. ................... 369/32 |
| 5,822,281 | * | 10/1998 | Yumita ................................... 369/13 |
| 5,953,296 | * | 9/1999 | Baba .............................. 369/44.29 X |

FOREIGN PATENT DOCUMENTS

| | | |
|---|---|---|
| 0261916A2 | 3/1988 | (EP) . |
| 0626687A1 | 11/1994 | (EP) . |
| 0649134A1 | 4/1995 | (EP) . |
| 63-78374 | 4/1988 | (JP) . |
| 63-78375 | 4/1988 | (JP) . |
| 04-351752 | 12/1992 | (JP) . |
| 08/77574 | 3/1996 | (JP) . |
| 9-124182 | 5/1996 | (JP) . |
| 09-167367 | 6/1997 | (JP) . |
| 09-167440 | 6/1997 | (JP) . |
| 09-274505 | 10/1997 | (JP) . |

* cited by examiner

*Primary Examiner*—Paul W. Huber
(74) *Attorney, Agent, or Firm*—Sughrue, Mion, Zinn, Macpeak & Seas, PLLC

(57) ABSTRACT

The present invention provides an optical disc drive apparatus comprising: an optical unit (2) for reading out a data recorded on an optical disc (1) from a position specified by a servo signal; a signal processor (4) for calculating and amplifying the data which has been read out by said optical unit (2); a microcomputer (5) provided with software for performing a calculation for a servo processing and a system control according to an output signal from said signal processor (4); and a servo driver (3) for performing a servo processing via said optical unit according to an output signal from said microcomputer.

13 Claims, 9 Drawing Sheets

FIG. 5

| |
|---|
| 1/4 fs (1) PROCESS START ADDRESS |
| 1/4 fs (2) PROCESS START ADDRESS |
| 1/8 fs (1) PROCESS START ADDRESS |
| 1/8 fs (2) PROCESS START ADDRESS |
| 1/4 fs (1) PROCESS START ADDRESS |
| 1/4 fs (2) PROCESS START ADDRESS |
| 1/16 fs (1) PROCESS START ADDRESS |
| 1/16 fs (2) PROCESS START ADDRESS |
| 1/4 fs (1) PROCESS START ADDRESS |
| 1/4 fs (2) PROCESS START ADDRESS |
| 1/8 fs (1) PROCESS START ADDRESS |
| 1/8 fs (2) PROCESS START ADDRESS |
| 1/4 fs (1) PROCESS START ADDRESS |
| 1/4 fs (2) PROCESS START ADDRESS |
| ⋮ |
| $1/2^{n+1}$ fs CHECK PROCESS START ADDRESS |
| $1/2^{n+2}$ fs CHECK PROCESS START ADDRESS |
| ⋮ |
| $1/2^n$ fs CHECK PROCESS START ADDRESS |

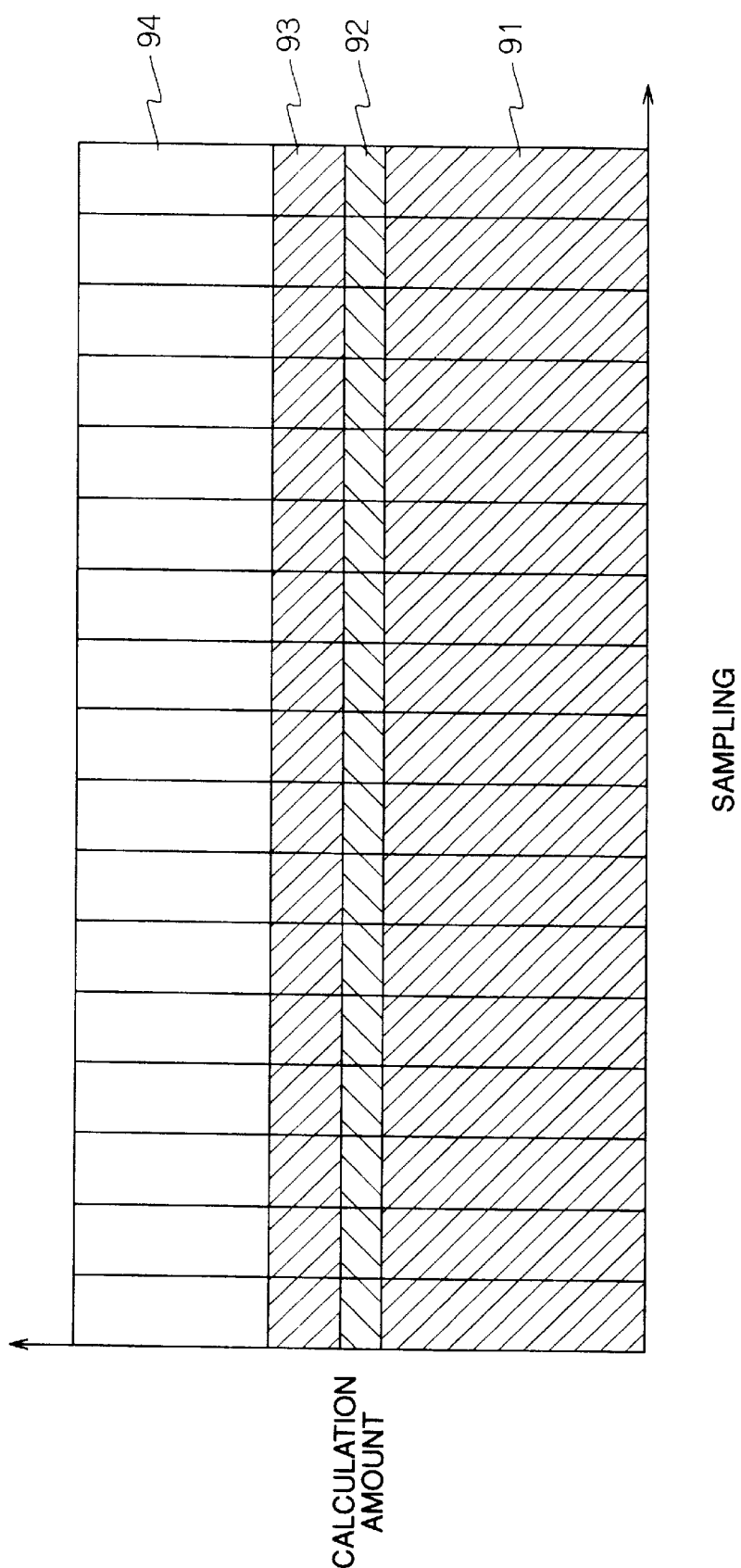

OPTICAL DISC DRIVE APPARATUS AND OPTICAL DISC DRIVE CONTROL METHOD

BACKGROUND OF THE INVENTION

1. Field of the Invention

The present invention relates to an optical disc drive and its control method and in particular, to a servo control method and an optical disc drive appropriate for implementing the control method.

2. Description of the Related Art

A conventional optical disc drive usually uses a servo signal processor circuit (hereinafter, referred to as an SSP) as hardware for carrying out a servo processing. An error signal outputted from an optical unit is supplied to the SSP so as to be compared to a target value and a difference between the error signal and the target value is corrected for carrying out the servo processing. FIG. 8A is a block diagram showing configuration example of an optical disc drive for carrying out such a servo processing with hardware.

Referring to FIG. 8A, according to a reproduction signal read out from an optical disc 1 by an optical unit 2, an RF circuit 4 creates a servo signal and an SSP 6 carries out a servo processing via a driver circuit 3 such as a focus servo, tracking servo, sled servo, and spindle servo. A microcomputer 5 carries out a system control such as a servo control sequence, disc information management, key-in information fetch, display control, and other system control.

The SSP 6 for the servo processing is constituted by hardware for carrying out the servo processing in parallel processing method. In this case, a filter calculation for determining a control amount for correcting the aforementioned difference between an error signal and a target value is carried out by combining an fs process with an 1/n fs process. The fs process is carried out for each sampling frequency (hereinafter, referred to as fs), and the 1/n fs process is carried out 1/n times of the sampling frequency. That is, a focus servo and a track servo need be controlled at a high speed, whereas a spindle servo need not be controlled at such a high speed as the focus and tracking servo. Accordingly, as shown in FIG. 9, the calculation amount varies depending on the sampling timing as follows: only an fs processing, or an fs processing in combination with a ¼ fs processing, or an fs processing in combination with a ¼ fs processing and ⅛ fs processing, and the like.

It should be noted that for carrying out a servo processing through hardware, there is also an optical disc drive using the SSP6 and the microcomputer 5 which are made as a unitary block. In this case also, the system control of the servo control is carried out by the microcomputer portion and the servo processing is carried out by hardware.

In the optical disc drive shown in block diagrams of FIG. 8A and FIG. 8B, the SSP 6 is hardware for carrying out a servo processing in a parallel processing method. However, it is desired to perform the servo processing with microcomputer software. If the servo processing is carried out by software, it becomes easy to modify the filter form such as the calculation order and calculation amount for general purpose. For example, a CD has been the main optical disc widely used, but recently new discs such as a PD (private disc, writable CD) and DVD (digital versatile disc) have been developed and are now in use. A servo processing through software would enable a single servo LSI to be used for various types of media.

However, if the servo processing which has been conventionally carried out by hardware is simply transferred to a microcomputer software, it is necessary to employ a microcomputer having a considerably high speed. This is because the processes carried out in parallel in the conventional hardware need be carried out in series in software, requiring a long calculation time at once. Moreover, as shown in FIG. 9, down sampling processes are concentrated in a particular sampling timing, and the time required for calculation greatly varies depending on the sampling timing.

SUMMARY OF THE INVENTION

It is therefore an object of the present invention to provide a servo control method in which a servo processing load per one sampling is averaged to reduce the maximum calculation amount. This enables to obtain a servo control and a system control at a sufficiently practical speed even by using a microcomputer having a comparatively low speed, and an optical disc drive apparatus appropriate for implementing the servo control method.

The present invention provides an optical disc drive apparatus for carrying out a servo processing and system control by software using a microcomputer. Moreover, the present invention provides an optical disc drive control method characterized in that an interrupt is generated at a servo processing sampling period for carrying out a digital servo processing, and the remaining time is used for carrying out a system control.

In a servo processing of the optical disc drive according to the present invention, down sampling processes are not concentrated at a particular sampling timing. That is, the down sampling processes are classified according to the sampling frequency and the function (such as focus and tracking). Head addresses of the classified down sampling processes are stored in a servo table which will be detailed later with reference to FIG. 5. Using this servo table and a counter value which is incremented by each sampling, a sampling process to be performed is selected from the servo table each sampling timing (step 22 in FIG. 6).

BRIEF DESCRIPTION OF THE DRAWINGS

FIG. 5 shows contents of the servo table.

FIG. 7 shows calculation amounts required at respective sampling timings in the servo processing according to the second embodiment.

DESCRIPTION OF THE PREFERRED EMBODIMENTS

Figure 1A:
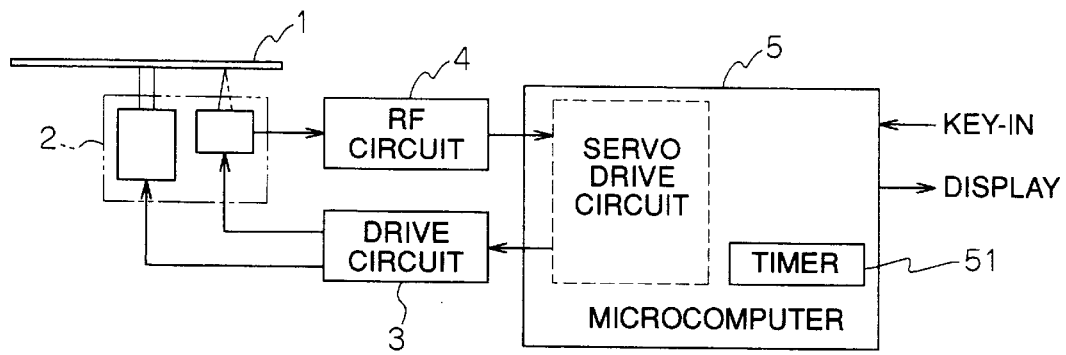
FIG. 1A is a block diagram showing a configuration of an optical disc drive apparatus according to a first embodiment of the present invention.
Figure 1B:
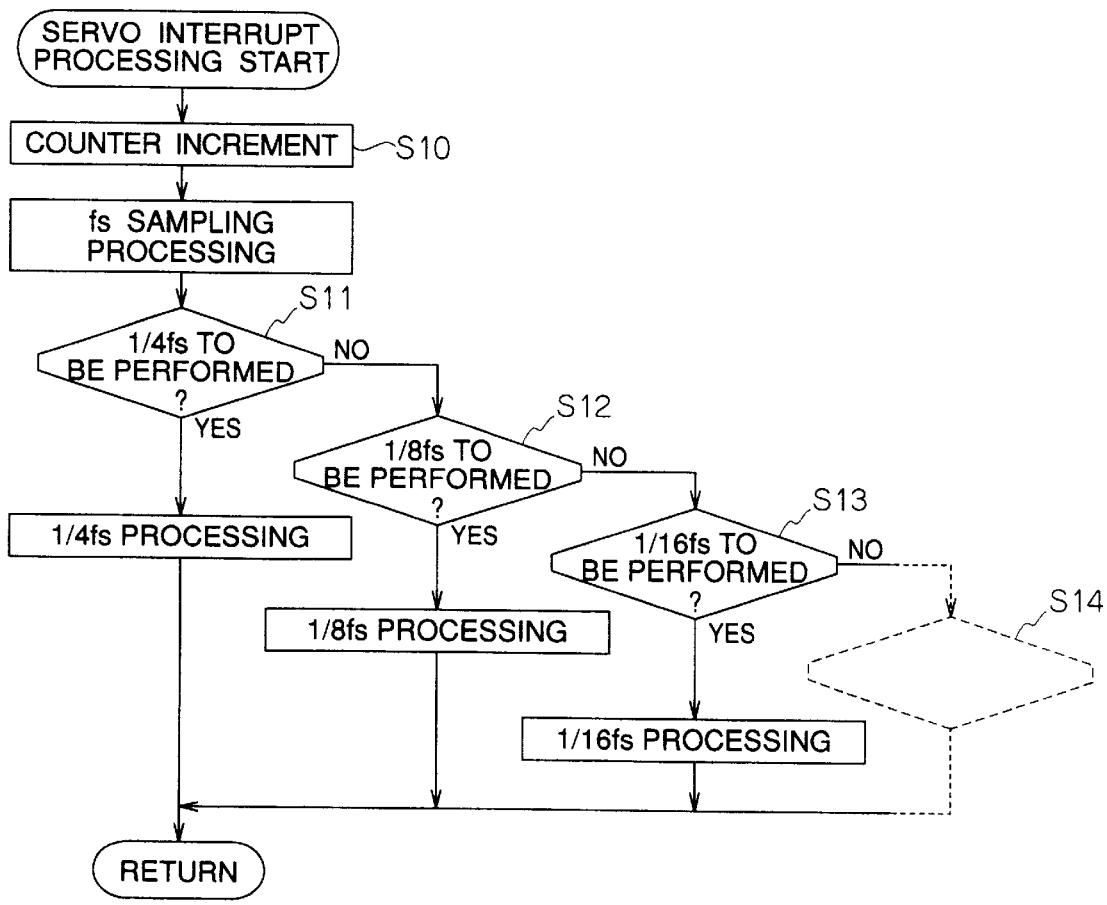
FIG. 1B is a flowchart showing a servo processing according to the first embodiment of the present invention.

Description will now be directed to embodiments of the present invention with reference to the attached drawings. Firstly, explanation will be given on a distribution of down sampling processes according to a first embodiment. FIG. 1A is a block diagram showing an optical disc drive apparatus according to the first embodiment, and FIG. 1B is a flowchart of a servo processing according to the first embodiment. Referring to FIG. 1, in the first embodiment, a timer 51 of a microcomputer 5 is used to generate an interrupt in one sampling timing so that a servo process is carried out within the interrupt processing. That is, as shown in FIG. 1B, down sampling processes are classified according to the sampling frequency in such a manner that one down sampling process is executed in each sampling timing. Thus, the calculation amounts of respective sampling timings are averaged, reducing the microcomputer load.

Figure 2A:
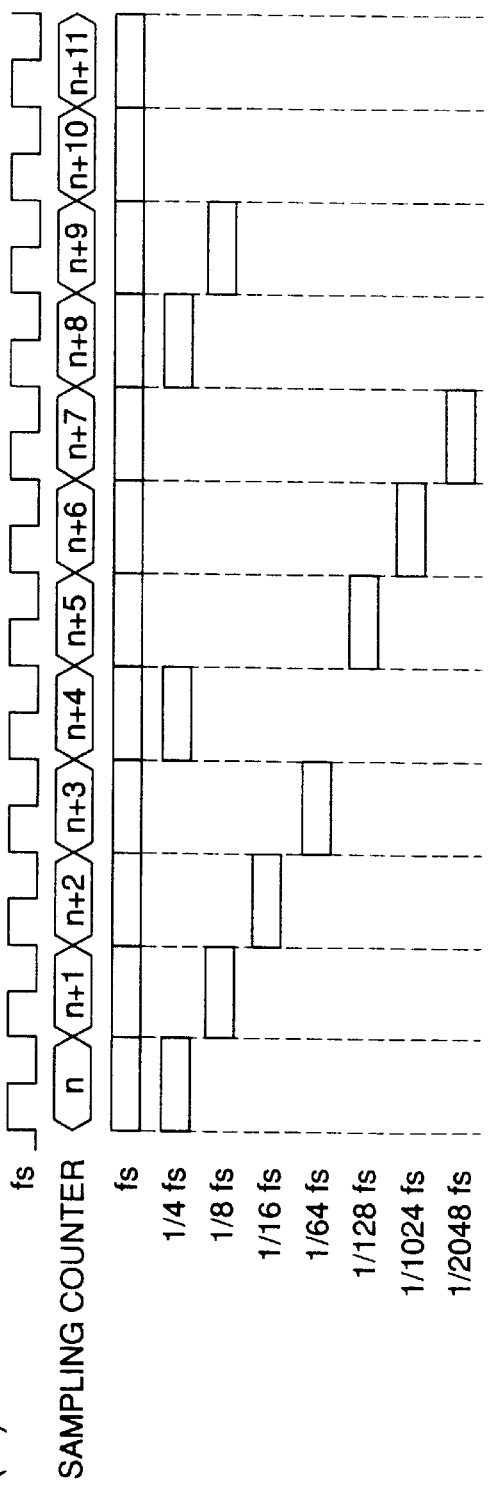
FIG. 2A shows servo processing processes distributed to respective sampling timings according to the first embodiment.
Figure 2B:
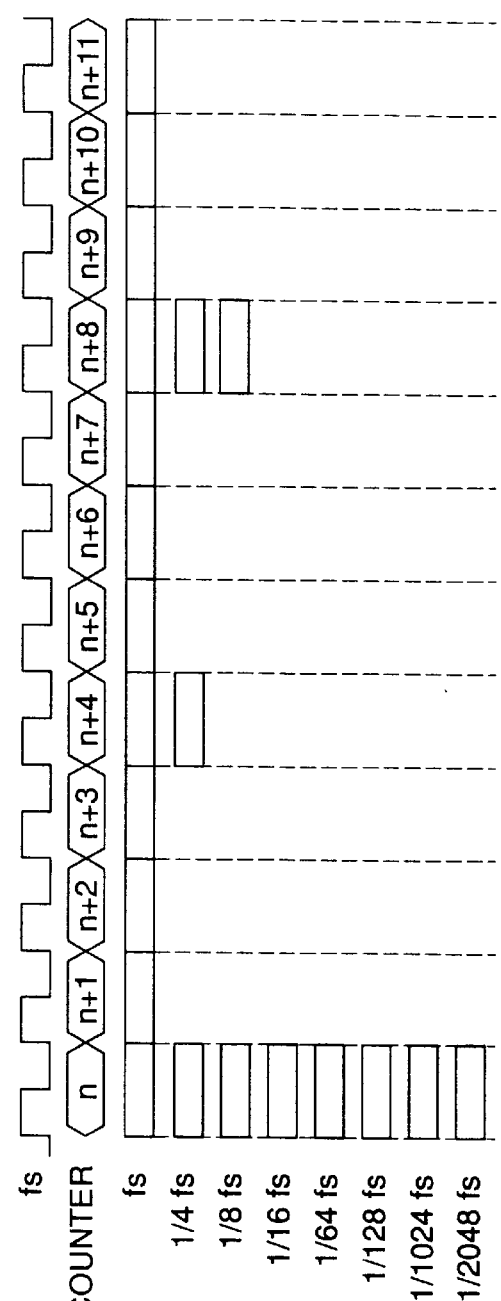
FIG. 2B shows conventional hardware servo processes simply expressed for microcomputer software.

FIG. 2 shows a distribution of down sampling calculation amounts according to the first embodiment (FIG. 2A) in comparison to a case (FIG. 2B) in which the servo processing conventionally carried out by hardware is simply transferred to a microcomputer software. As can be seen from FIG. 2, in the present embodiment, down sampling processes are distributed evenly for each sampling timing, averaging the calculation amounts required in each sampling timing. On the contrary, in the case of simple transfer to a microcomputer software, a number of down sampling processes are concentrated in a particular sampling timing, greatly increasing the calculation amount.

Referring back to FIG. 1B, according to the present embodiment, a counter value of a counter incremented by each fs (step 10) is used to check whether to execute a down sampling process by referencing less significant bits (step 11). For example, when check is made whether to execute a ¼ fs down sampling process, i.e., a process which is executed once in four sampling timings, the least significant two bits are referenced. In a case of 1/512 fs process, the least significant 9 bits are referenced (AND-ed).

In order to prevent overlap of more than one down sampling processes within one sampling timing, an appropriate correction value (a negative integer) is added to the aforementioned referenced value. If the referenced value is 0, the down sampling process is executed. Otherwise, control is passed to check whether to execute a following down sampling process (step 12). For example, for a ¼ fs process, the least significant 2 bits are referenced, and for a ⅛ fs process, the least significant 3 bits are referenced. In this case, if the counter value is 8 for example, both of the ¼ fs process and the ⅛ fs process are to be executed because the least significant 3 bits are 0. To prevent such an overlap, a correction value inherent to respective down sampling processes is added to the counter value. If 0 is the correction value for a ¼ fs process and −1 for a ⅛ fs process, then the ¼ fs process is executed when the least significant 2 bits are 0 and the ⅛ fs process is executed when the least significant 3 bits are 1. Thus, it is possible to prevent overlap of a plurality of processes.

In steps S14 and after, the same down sampling process check is carried out as in the ¼ fs and ⅛ fs processes. That is, when a check is made for a down sampling process of $\frac{1}{2^n}$ fs, a counter value is used to reference the least significant n bits, to which a corresponding correction value (negative integer) is added. If the resultant value is 0, the down sampling process is carried out. Otherwise, control is passed to check a following down sampling process ($\frac{1}{2^{n+1}}$ fs process).

Figure 3:
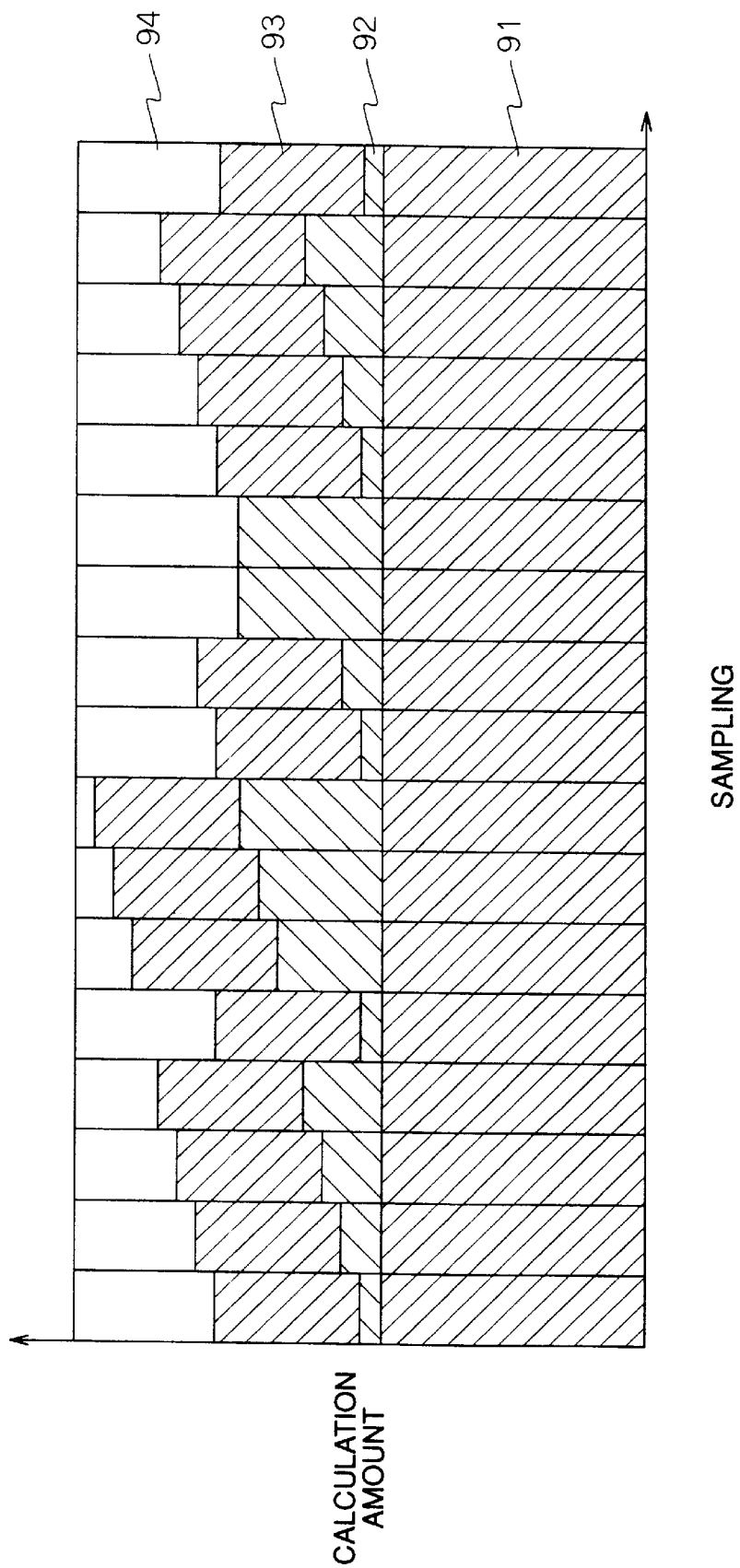
FIG. 3 shows calculation amounts required at respective sampling timings according to the first embodiment.
Figure 9:
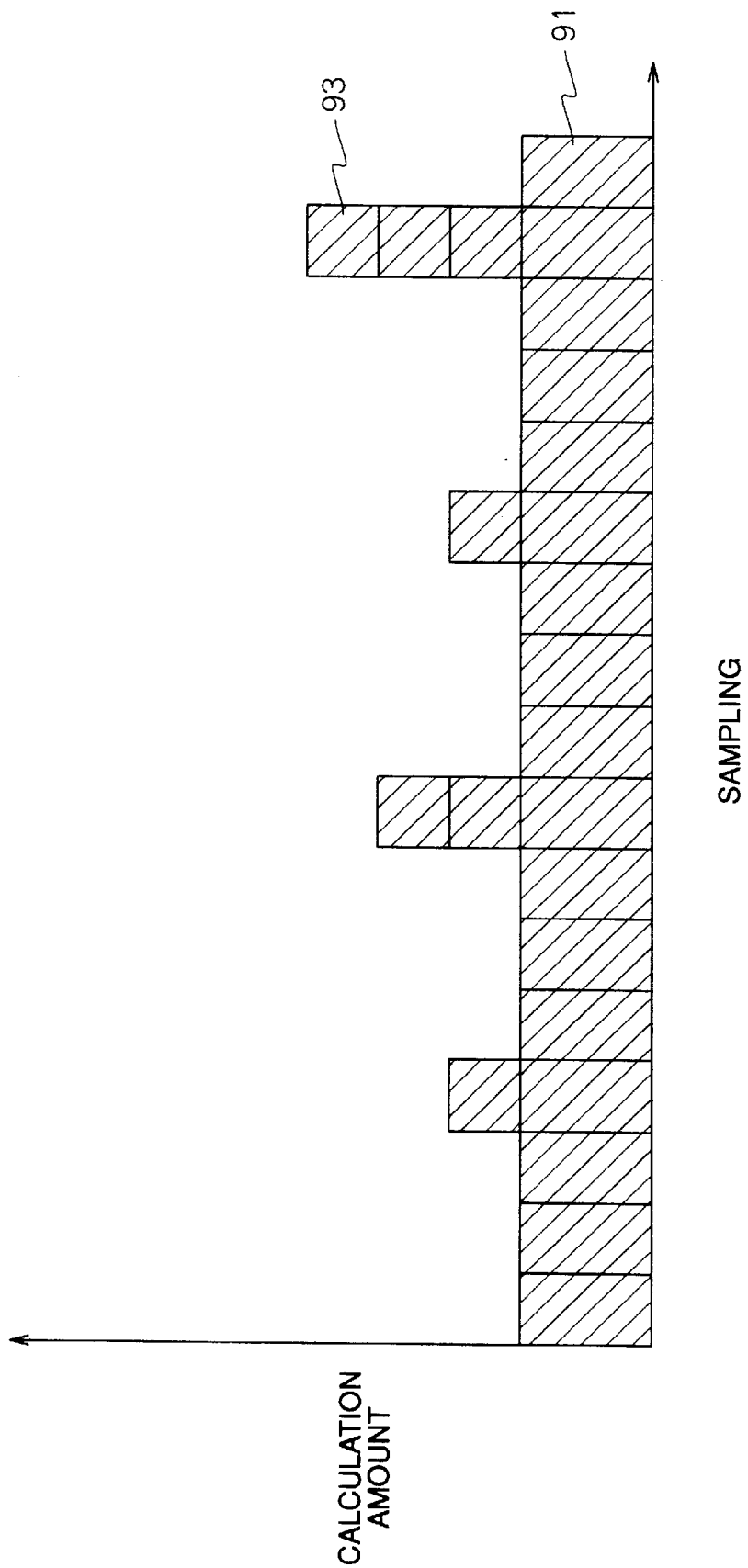
FIG. 9 shows calculation amounts required at respective sampling timings when a servo processing conventionally performed by hardware is to be performed by microcomputer software.

FIG. 3 shows the calculation amounts at respective sampling timings according to the present embodiment. As is clear from FIG. 3, the calculation amount varies depending on the sampling timing. This is because the execution check is carried out in the descending order of the sampling frequency. As the sampling frequency decreases, the number of checks is increased. That is, a branching 92, i.e., a referencing of a sampling counter value at the head of each down sampling process to decide whether to perform the down sampling process is repeated an increased number of times as the sampling frequency is decreased. However, if FIG. 3 is compared to FIG. 9, it is clear that the calculation amount is more dispersed (less concentrated) in the present embodiment.

Figure 4:
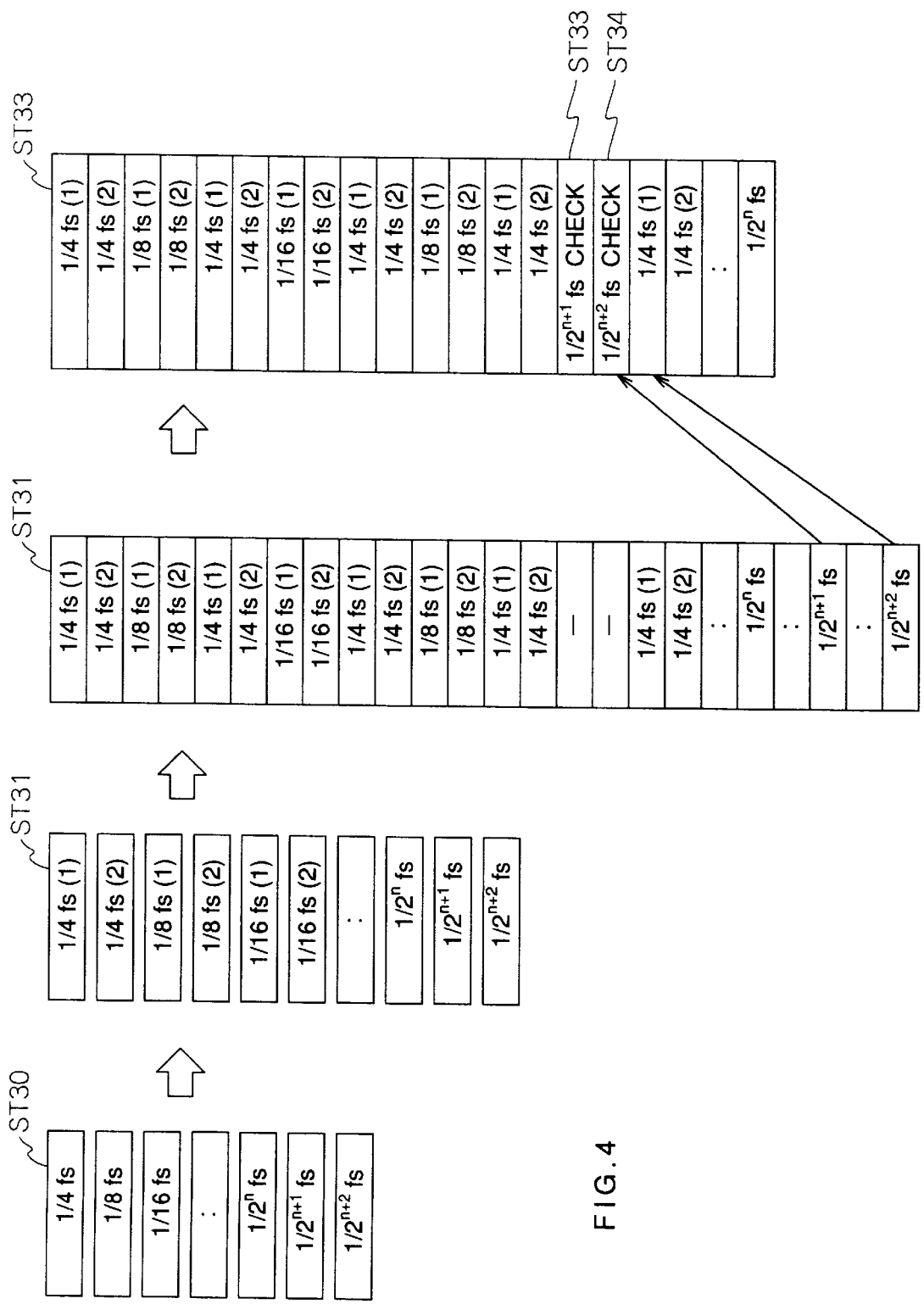
FIG. 4 shows creation of a servo table according to a second embodiment of the present invention.

Next, description will be directed to a second embodiment of the present invention. In this embodiment, down sampling processes are distributed by using a servo table. In this embodiment also, the timer 51 of the microcomputer 5 in FIG. 1 is used to generate an interrupt at each sampling timing so that a servo process is carried out within the interrupt processing. FIG. 4 shows a table data creation procedure. Referring to FIG. 4, down sampling processes are arranged in the descending order of the sampling frequency (step 30).

Note that there are left timings when no down sampling processes are executed. This is because down sampling cycle is normally $\frac{1}{2^n}$ fs, and no down sampling processes are carried out at a timing such as $1/(2^n+1)$ fs for example. To utilize such sampling timings, the down sampling processes are further classified according to the functions such as focus and tracking, so that one of the functions is carried out in such a timing left. This classification according to the function is made into two groups (step 31). If the classification is carried out into three groups, there will arise a timing when a down sampling process of that frequency is concurrent with a down sampling of a lower frequency. For example, when carrying out ¼ fs, ⅛ fs, and 1/16 fs down sampling processes, if the ¼ fs processes are divided into three groups, as shown in a left column of Table 1 below, there will arise a timing when a ⅛ fs process or 1/16 process is overlapped with a ¼ fs process. That is, the ⅛ fs process or the 1/16 process cannot be divided into two or more groups. Even if they are divided into two or more groups, a down sampling process having a frequency lower than 1/16 fs cannot be divided at all.

TABLE 1

| 0  | ¼ fs (1)  | ¼ fs (1)    |
|----|-----------|-------------|
| 1  | ¼ fs (2)  | ¼ fs (2)    |
| 2  | ¼ fs (3)  | ⅛ fs (1)    |
| 3  | ⅛ fs      | ⅛ fs (2)    |
| 4  | ¼ fs (1)  | ¼ fs (1)    |
| 5  | ¼ fs (2)  | ¼ fs (2)    |
| 6  | ¼ fs (3)  | 1/16 fs (1) |
| 7  | 1/16 fs   | 1/16 fs (2) |
| 8  | ¼ fs (1)  | ¼ fs (1)    |
| 9  | ¼ fs (2)  | ¼ fs (2)    |
| 10 | ¼ fs (3)  | ⅛ fs (1)    |
| 11 |           | ⅛ fs (2)    |

TABLE 1-continued

| 12 | ¼ fs (1) | ¼ fs (1) |
| 13 | ¼ fs (2) | ¼ fs (2) |
| 14 | ¼ fs (3) | |
| 15 | | |

More specifically, a ¼ fs process is repeated at a periodicity of Execution-Nope-Nope-Nope. If ¼ fs processes are divided into two groups, i.e., ¼ fs (1) and ¼ fs (2), the servo table will repeat a sequence of four successive sampling timings assigned for ¼ fs (1), ¼ fs (2), other process, other process. If the ⅛ processes are also divided into two groups, the servo table will repeat a sequence of eight successive sampling timings assigned for ¼ (1), ¼ (2), ⅛ (1), ⅛ (2), ¼ (1), ¼ (2), other process, other process. Thus, the servo table has a periodicity in the contents (step S32), leaving timings not assigned for any process. Such timings are utilized to check whether to execute a down sampling process of a lower sampling frequency (steps S33 and S34). This enables to create a servo table as shown in FIG. 5.

Figure 6:
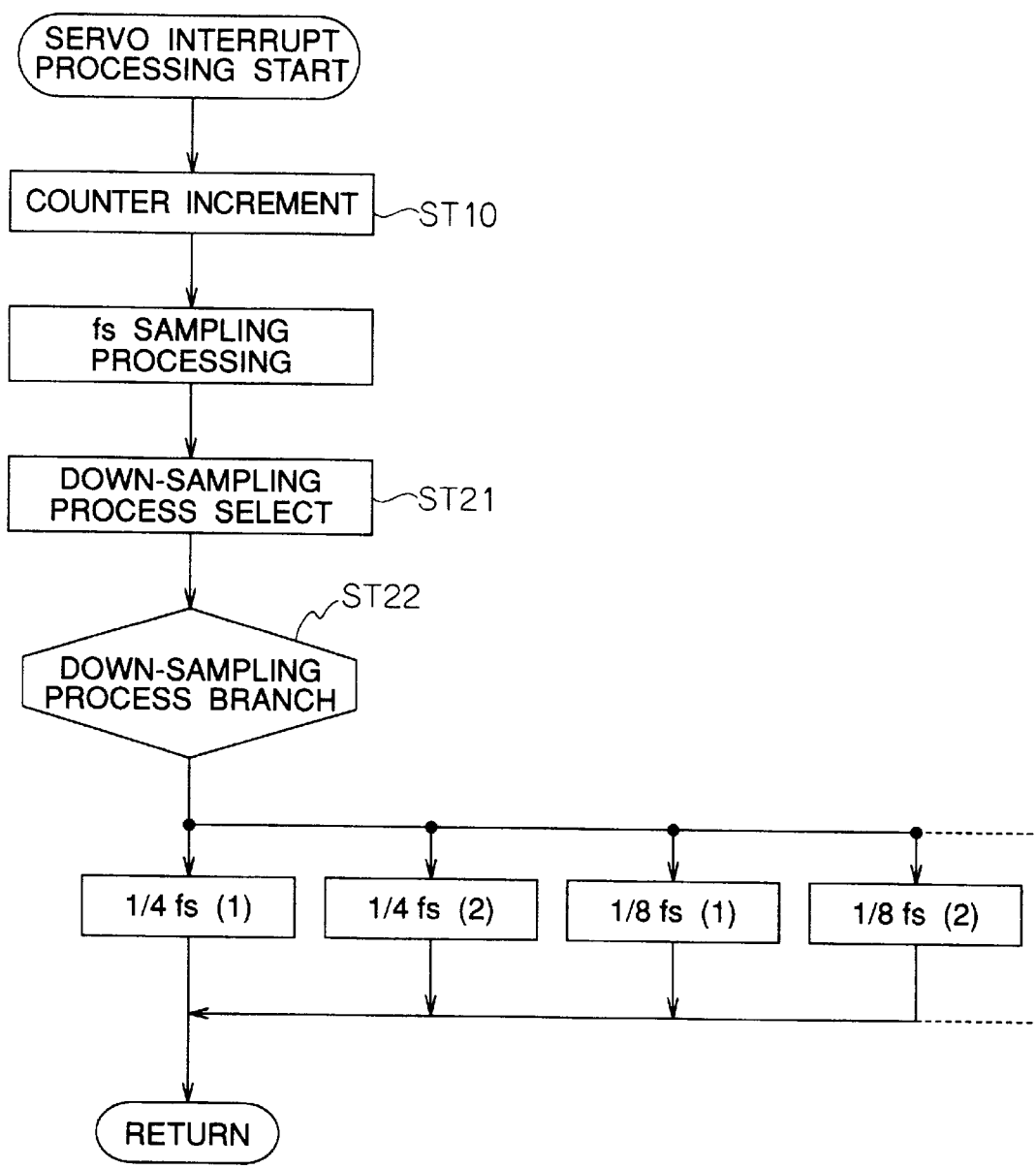
FIG. 6 is a flowchart showing a servo processing according to the second embodiment.
Figure 8A:
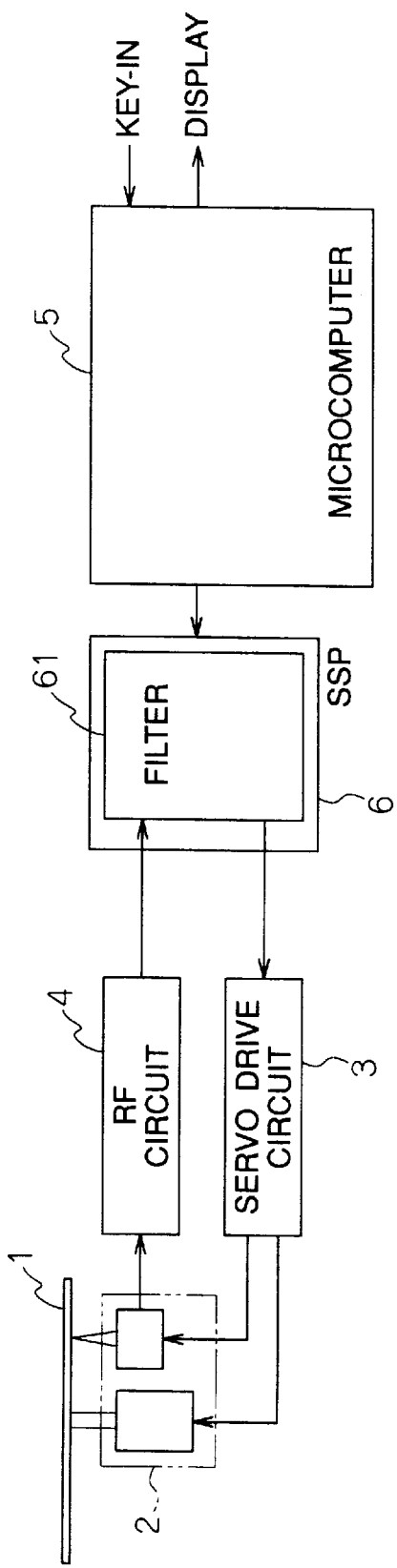
FIG. 8A is a block diagram showing a configuration of a conventional optical disc drive apparatus in which a servo processing is performed by hardware.
Figure 8B:
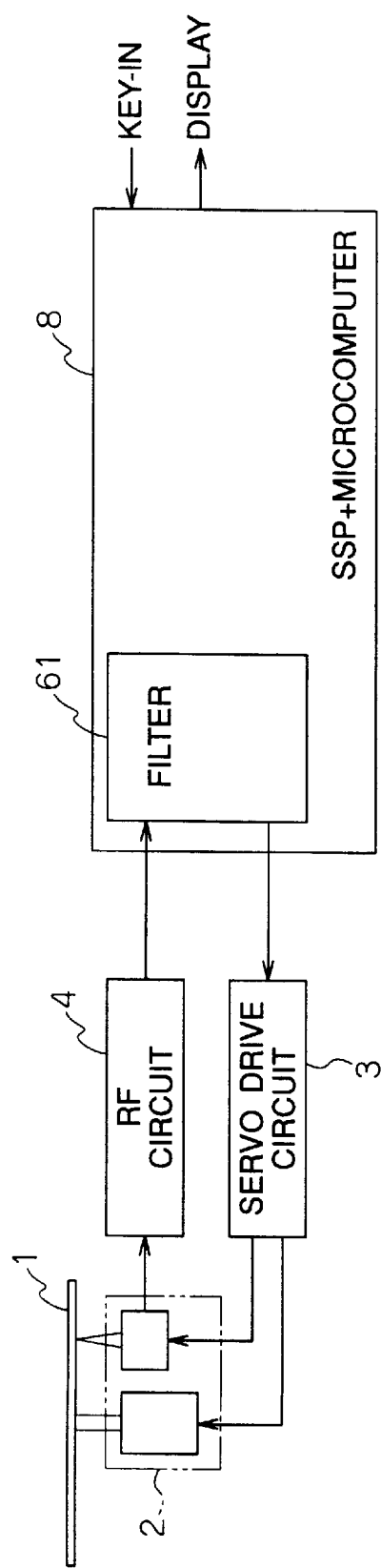
FIG. 8B shows a variation of the conventional optical disc drive apparatus.

FIG. 6 is a flowchart showing the second embodiment. In the second embodiment, a head address of a down sampling process contained in the servo table is used as a base address in combination with an offset address, i.e., a counter value incremented by each sampling (step 10). The base address is added to the offset address to determine a physical address containing a head address of a down sampling process to be executed (step S21). After this, an unconditional branching is executed to the physical address determined (step S22) for executing the down sampling process.

FIG. 7 shows calculation amounts for the respective sampling timings according to the second embodiment. In comparison to FIG. 3 where the branching time varies depending on the sampling timing, FIG. 7 shows that the branching using the servo table can be performed with an almost identical calculation amount regardless of the sampling timing. Moreover, by distributing the down sampling processes for the respective sampling timings, it is possible to average the calculation amount per one sampling as well as to reduce the number of sampling timings not assigned for any down sampling process.

As has been described above, according to the present invention, down sampling processes are distributed for respective sampling timings so as to average the calculation amount at each sampling timing and reduce the maximum calculation amount at one timing. Thus, the present invention enables to perform a servo processing using microcomputer software while preventing an increase of the calculation time per sampling. This enables to assure a practical processing speed even with a microcomputer not having a high speed.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-307211 (Filed on Nov. 10, 1997) including specification, claims, drawings and summary are incorporated herein by reference in its entirety.

What is claimed is:

1. An optical disc drive apparatus comprising:
    an optical unit for reading out a data recorded on an optical disc at a position specified by a servo signal;
    a signal processor for processing said data which has been read out by said optical unit;
    a microcomputer provided with software for executing a calculation for a servo processing and a system control according to an output signal from said signal processor; and
    a servo driver for performing a servo processing via said optical unit according to an output signal from said microcomputer,
    wherein said microcomputer (i) generates an interrupt at a servo processing sampling period; and (ii) performs a digital servo processing at said interrupt and a system control processing including a disc information management in a time excluding the servo processing.

2. An optical disc drive apparatus as claimed in claim 1, wherein down sampling processes to be performed not at each sampling cycle (fs) but at each 1/n of sampling cycle (1/n fs) are distributed in such a manner that only one down sampling process is performed within each interrupt processing.

3. An optical disc drive apparatus as claimed in claim 2, wherein said down sampling processes are assigned to respective sampling timings in a descending order of sampling frequency.

4. An optical disc drive apparatus as claimed in claims 2, wherein said microcomputer including a counter whose value is incremented at each sampling timing and;
    said microcomputer adds a predetermined correction value to said counter value in accordance with a sampling frequency of a down sampling process for deciding whether to perform said down sampling process at that sampling timing.

5. An optical disc drive apparatus as claimed claims 2, wherein down sampling processes of a higher sampling frequency are further divided into two groups according to servo control objects.

6. An optical disc drive control method for controlling an optical disc drive apparatus comprising a optical unit for reading out a data recorded on an optical disc from a position specified by a servo signal; microcomputer for executing a calculation for system control processing, and a servo driver for performing a servo processing via said optical unit
    said method comprising steps of:
    generating an interrupt at a servo processing sampling period; and
    executing a calculation for a digital servo processing at said interrupt and for a system control processing including a disc information management in a time excluding said interrupt processing.

7. An optical disc drive control method as claimed in one of claims 6, wherein down sampling processes to be performed not at each sampling cycle (fs) but at each 1/n of sampling cycle (1/n fs) are distributed in such a manner that only one down sampling process is performed within each interrupt processing.

8. An optical disc drive control method as claimed in claim 7, wherein said down sampling processes are assigned to respective sampling timings in a descending order of sampling frequency.

9. An optical disc drive control method as claimed in claim 8, wherein said executing a calculation step comprising steps of:

incrementing at each sampling timing; and adding a predetermined correction value to a counter value in accordance with a sampling frequency of a down sampling process for deciding whether to perform said down sampling process at that sampling timing.

10. An optical disc drive control method as claimed in claim 7, wherein down sampling processes of a higher sampling frequency are further divided into two groups according to servo control objects.

11. An optical disc drive apparatus comprising:

an optical unit for reading out a data recorded on an optical disc from a position specified by a servo signal;

a signal processor for processing said data which has been read out by said optical unit;

a microcomputer provided with software for executing a calculation for a servo processing and a system control according to an output signal from said signal processor; and a servo driver for performing a servo processing via said optical unit according to an output signal from said microcomputer;

wherein said microcomputer including a servo table containing start addresses of all down sampling processes to be performed not at each sampling cycle (fs) but at each 1/n of sampling cycle (1/n fs) distributed in such a manner that only one down sampling process is performed within each interrupt processing;

wherein said microcomputer
  (i) generates an interrupt at a servo processing sampling period;
  (ii) deciding a down sampling process is to be executed according to said servo table; and
  (iii) executing said down sampling process at said interrupt.

12. An optical disc drive apparatus as claimed in claim 11, wherein said servo table is created in such a manner that sampling timings not assigned to any down sampling process are used to check whether to perform a down sampling process of a lower sampling frequency.

13. An optical disc drive apparatus as claimed in claim 12, said apparatus further comprising a servo processing program for using a start address of a down sampling process contained in said servo table as a base address in combination with a counter value as an offset address to determine a physical address containing said start address and to perform said down sampling process.

* * * * *

UNITED STATES PATENT AND TRADEMARK OFFICE
CERTIFICATE OF CORRECTION

PATENT NO. : 6,301,206 B1
DATED : October 9, 2001
INVENTOR(S) : Akihisa Nomura, Hiroyuki Tanaka and Toshiaki Shimone It is certified that error appears in the above-identified patent and that said Letters Patent is hereby corrected as shown below:

<u>Title page,</u>
Item [54], please delete title of the invention "OPTICAL DISC DRIVE APPARATUS AND OPTICAL DISC DRIVE CONTROL METHOD" insert -- OPTICAL DISC DRIVE CONTROL APPARATUS AND METHOD WITH SERVO PROCESSING LOAD RATE AVERAGED TO REDUCE MAXIMUM CALCULATION REQUIREMENTS --
Item [30], please delete "Foreign Application Priority Data October 11, 1997" insert -- Foreign Application Priority Data November 10, 1997 --

Signed and Sealed this

Eleventh Day of June, 2002

*Attest:*

*Attesting Officer*

JAMES E. ROGAN
*Director of the United States Patent and Trademark Office*